Search Room

March 3, 1936. L. E. JONES Re. 19,877

Orig. 1,946,021

METHOD AND APPARATUS FOR TREATING FRUIT

Original Filed June 1, 1929

Lloyd E. Jones
INVENTOR.

99. FOODS AND BEVERAGES

Search Room

Reissued Mar. 3, 1936

Re. 19,877

UNITED STATES PATENT OFFICE 19,877

METHOD AND APPARATUS FOR TREATING FRUIT

Lloyd E. Jones, Santa Monica, Calif., assignor to Food Machinery Corporation, San Jose, Calif., a corporation of Delaware Original No. 1,946,021, dated February 6, 1934, Serial No. 367,666, June 1, 1929. Application for reissue November 17, 1934, Serial No. 753,555

15 Claims. (Cl. 146—202)

My invention relates to a process and apparatus for brushing, polishing, or similarly treating the surfaces of individual particles, particularly those of delicate texture or surface, such as apples, lemons, and the like.

One of the important objects of the invention is to provide a process and apparatus for brushing or polishing fruit without injury, and particularly without permitting one fruit to come in contact with another.

Another object of the invention is to provide a process and apparatus of the class described for polishing irregular shaped articles, such as apples, it being understood that apples in passing through a brushing machine tend to rotate upon certain axes without presenting either the stem end or the blossom end to the brushes.

Still another object of the invention is to provide the process and apparatus for brushing and polishing irregular shaped articles, particularly apples, and in which process and apparatus the article is continually rolled from one axis to another, so that all surfaces and surface cavities are periodically brought into contact with brushing surfaces.

While the invention, and the particular embodiment which I am about to describe, is adapted for handling a wide variety of individual articles, I have, without intent to limit the scope of application of my invention, illustrated by the accompanying drawing, one practical embodiment of my invention adapted particularly to polishing apples and the like. Accordingly, the ensuing description is directed more particularly to the polishing of apples, but such description will enable those skilled in the art of building and using such machines to construct and operate machines in conformity with my invention, for other purposes.

Figure 1:
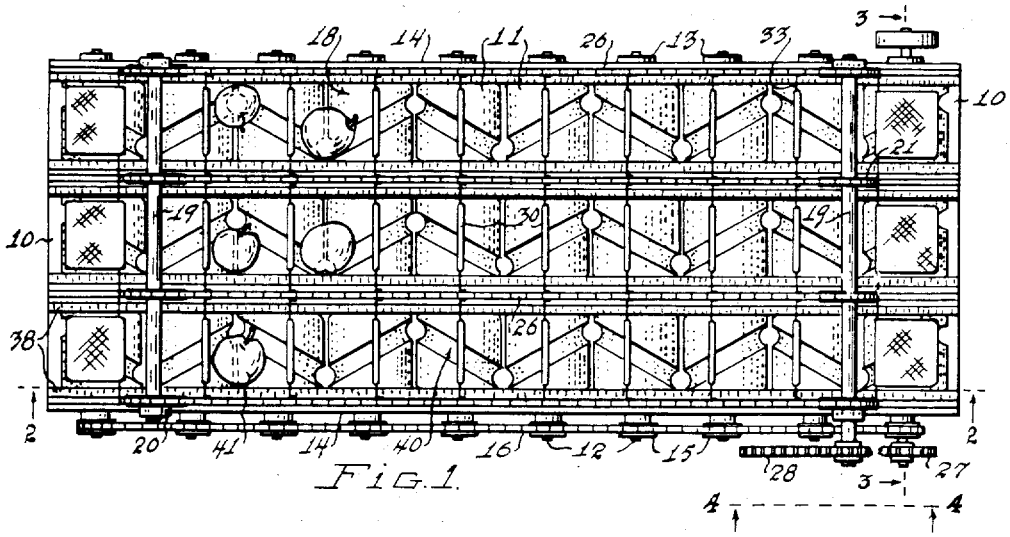
Figure 1 is a plan view of such machine or embodiment.
Figure 2:
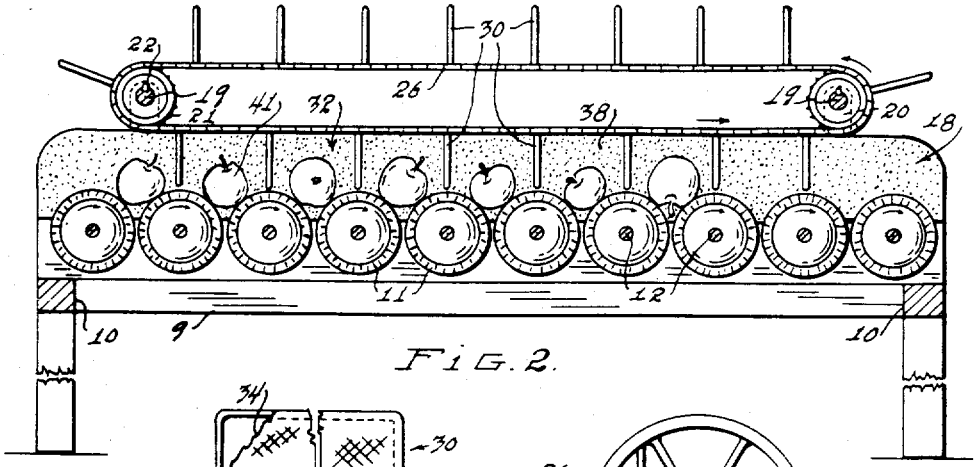
Figure 2 is a side sectional view taken along the line 2—2 of Figure 1.
Figure 5:
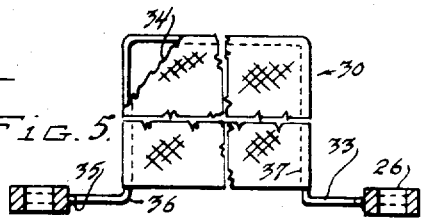
Figure 5 is a detailed view drawn to an enlarged scale illustrating the construction of one of the pusher elements.
Figure 4:
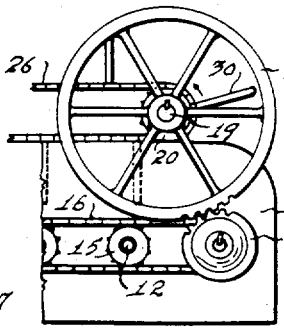
Figure 4 is a partial side elevation as viewed from line 4—4 of Figure 1.
Figure 3:
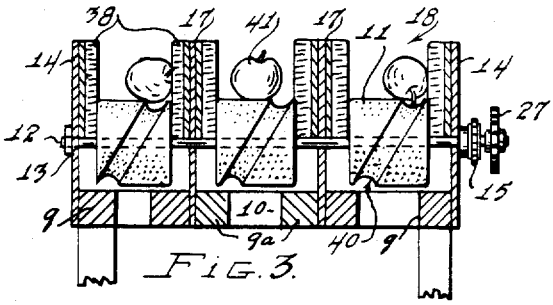
Figure 3 is a view in section on the line 3—3 of Figure 1.

More specifically the said embodiment comprises a suitably supported frame including parallel side members or walls 9, 9, and end members 10, 10 tying said walls together. Transversely of the frame a plurality of juxtaposed rotary brushes 11 are arranged. Each brush is on the same horizontal plane as the others; each having an axis or shaft 12 revolving in corresponding bearings 13 provided by the side walls 14. At each end of each shaft a sprocket wheel 15 is attached externally to the frame and endless chains 16 connect all sprockets so that all brushes may be revolved simultaneously at the same peripheral speed and all in the same direction.

A plurality of longitudinally extending partitions 17 are arranged in parallel relation to one another above the brushes so that the side walls and said partitions and brushes coact to provide a plurality of fruit runways 18; the bottom surfaces of which are formed by the brushes. These runways extend from end to end of the machine and are open at each end.

Adjacent each end of the machine on the top surface of the side walls, a shaft 19 is mounted in bearings 20. Each shaft extends transversely across the runway adjacent the corresponding end of the machine and each shaft is provided with a plurality of sprocket wheels 21 keyed thereto as at 22; there being on each shaft one such sprocket wheel for each intermediate member and for each side wall. The corresponding sprockets of one shaft are aligned with the corresponding sprockets of the other shaft and endless chains 26 run over and connect all aligned sprockets. A drive sprocket 27 on the first brush shaft is connected to a driven sprocket 28 on one of the shafts 19 so that when the first brush shaft revolves, all of the shafts and sprockets throughout the machine will be driven accordingly.

The lower parts of the chains 26 are arranged to ride upon the top surfaces of the side walls or intermediate walls, as the case may be; the weight of the chains holding them normally in contiguity therewith.

Between each two adjacent chains, and carried thereby, pusher pads 30 are arranged. These pads project from the chains at suitable angles so that those at the lowermost side of the chains depend into the aforesaid individual runways. These pads are preferably spaced along the chains at the same spacing as the brushes to provide fruit pockets 32, 32, etc., equal in length to the spacing of the brushes longitudinally of the machine. Each pocket is, therefore, bounded on the bottom by corresponding areas of one or more brushes; on the sides by the partitions or end walls, as the case may be, and at front and rear by the two corresponding pusher pads.

Any suitable construction is employed for the pads and in the present embodiment each pad is shown as comprising two wires 33, 33 and a piece of fabric 34.

The wires are opposed; one wire being carried by one chain and the other wire by the next adjacent chain. Each wire is welded rigidly to the corresponding chain, as at 35, extending horizontally outward laterally of and above the runway a slight distance; thence turning a right angle, as at 36, and thence projecting down into the runway. The fabric is stretched from one wire to the other and stitched thereto, as at 37, thus forming a resilient surface. The wires are light and flexible so that the pads may bend and conform as required.

In conformity with a salient feature of my invention, each side of each intermediate member and the inside of each side wall is lined with a co-extensive fixed brush, such as 38, so that each fruit runway is bounded by brushes both at the sides and bottom. The brushes should be of texture best suited to the material to be brushed; soft hair brushes being recommended where delicate fruit skins are encountered. Each pusher pad is of such width as to fit reasonably close transversely of the runway; the drawing indicating a good arrangement.

In conformity with another feature of the invention, each revolving brush is provided with a helical groove 40; the grooves of the alternate brushes running right-hand and the grooves of the intermediate brushes running left hand; thus, each brush having a left hand helical groove is in juxtaposition to a brush having a right hand groove. These grooves are of such shape and dimension as to permit of fruit, such as apples 41, partially reposing therein when permitted to do so. Considering the machine longitudinally, the first rotary brush and the last rotary brush are each arranged outwardly beyond the corresponding shaft so that fruit may be deposited on the first brush, or removed from the last brush without interference from the pusher pads and the chains.

The apparatus or machine for treating fruit above-described and the process of the present invention, as carried out in said apparatus or machine, are as follows, the description being given particularly as it is applied to polishing apples. By suitable means one brush shaft is revolved in the direction indicated by the adjacent arrows and by means of the sprockets and chains all brushes and shafts revolve; the brushes rotating all in a direction ranging forwardly of the machine, and the pusher pads travelling through the fruit runways at a slower speed preferably than that represented by the peripheral speed of the brush. Now fruit is fed either manually or by any suitable or well known means singly to the individual runways; the fruit being deposited one after another successively on the corresponding part of the first brush. Each apple as it is laid upon the first brush rolls into the depression existing between the first and second brushes. The diameter and spacing of the brushes is so proportioned relative to the maximum size of fruit handled that an apple tends to remain in such depression rather than being transferred by one brush to the next. In other words, as a brush revolves it attempts to lift the fruit slightly, but the fruit immediately rolls back into the aforesaid depression. This phenomenon results in the fruit continually rolling or spinning between two brushes and between the two side brushes. Coupled with this motion the left hand spiral groove in one brush tends to move the fruit to one side of the runway, while the right hand spiral in the adjacent brush tends to move the fruit to the other side. A universal spinning motion on the part of the fruit results and this motion subjects all surfaces of the fruit to the brushes; both the stem end and the blossom end of the fruit coming periodically in contact with brushing surfaces. Now a pusher pad comes behind the single fruit and forces it against a forward brush and increasing the friction or traction between the fruit and brush. At the same time the action of the groove of such brush will force the fruit against one of the side brushes, from which it may immediately rebound and by various forces be thrown to the other side of the runway against the other side brush. The pusher pad in progressing rolls the fruit up over the next forward brush and into the next succeeding depression between brushes. The action is rapid and quite difficult of full description, but a glance at the machine in operation will show an apple held between two pusher pads and being transferred over the brushes successively while rolling and spinning and bounding from side to side of the runway. The brushing action provided is very thorough and continuous although gentle and harmless. The machine should be fed with fruit one in each runway as fast as each pusher pad comes into action. In the drawing the first few depressions are shown filled with fruit and as more fruit is fed in the machine becomes full; each pocket between two pusher pads containing only one fruit which at no time comes in contact with another fruit and which at no time is subject to any surfaces other than the resilient surfaces provided either by the pads or brushes. As the fruit eventually reaches the last brush and remains in the depression between the last brush and the next to last brush, it is removed manually, or by the pusher pads immediately before another fruit is delivered to the same position.

While it will be understood that although I have illustrated my invention as applied to a brushing process and apparatus, other types of supporting elements may be used in lieu of the brushes shown without departing from the spirit of my invention. It will also be seen that various other changes and variations may be made within the spirit of my invention, and I deem myself entitled to all such changes and variations as fall within the scope of the claims appended hereto.

I claim:

1. In a machine of the class described, a plurality of parallel closely spaced brushes providing a horizontal article brushing surface extending transverse to the axis of the brushes, means for revolving said brushes co-ordinately all in the same direction; said brushes providing grooves, one between each pair of adjacent brushes; said brushes of such proportion that each groove will hold an individual article so that the brushes are incapable normally of moving the article from such groove, resilient means at each side of such surface to retain an article thereon, a plurality of pusher pads spaced apart approximately the spacing of said brushes, and means for moving said pusher pads in such spaced arrangement above said surface in the direction of travel of the upper surfaces of said brushes; two adjacent pads coacting with corresponding parts of the retaining means and with corresponding portions of the article carrying surface to provide an individual traveling pocket; the axis of each brush being fixed.

2. An apparatus of the class described, comprising a series of substantially cylindrical rotatable supporting members arranged in adjacent parallel relation so as to form article holding grooves therebetween, means for rotating all of said members in a common direction, a plurality of retaining walls provided with brushing surfaces above said supporting members and extending transversely thereto to form a plurality of adjacent runways, a plurality of resilient pusher aprons disposed above said members in each runway so as to engage with articles in said grooves, said aprons being spaced apart approximately the spacing of the supporting members and cooperating therewith and with the retaining walls to form individual article holding pockets, and means for moving the pusher aprons transversely of the supporting members whereby said pockets urge articles therein from groove to groove.

3. In an apparatus of the character described, a brushing runway comprising a plurality of substantially cylindrical supporting brushes mounted on fixed axes in adjacent parallel relation to form article holding grooves therebetween, the diameter and spacing of the brushes being such that globular articles deposited in the grooves will not be advanced from groove to groove by the rotative effect of the brushes alone, means for rotating all of said brushes in a common direction, a pair of retaining walls defining the lateral limits of the runway, a carrier disposed above the runway in such manner as not to contact with globular articles passing from groove to groove over the brushes, a plurality of pusher aprons depending from the carrier to contact with globular articles resting in the grooves between the brushes, said aprons being spaced apart approximately the spacing of the brushes and cooperating with said retaining walls to form successive traveling pockets, and means for operating the carrier to move the aprons transversely of the brushes in the direction of travel of their upper surfaces and slower than their peripheral speeds.

4. In an apparatus for treating articles of a rollable nature such as fresh fruit and the like, a conveyor comprising a series of substantially cylindrical supporting members arranged in adjacent parallel relation transversely of the path of articles passing thereover and forming article holding grooves therebetween, means for rotating said supporting members in a common direction about fixed axes, the axial spacing of said supporting members being greater than the diameter of rollable articles being conveyed and the proportions of said supporting members relative to the size of conveyed articles being such that the supporting members are normally incapable of moving said articles from groove to groove thereacross, means extending longitudinally of the conveyor for retaining conveyed articles thereon, a plurality of pusher means arranged above the conveyor and spaced apart the axial spacing of said supporting members, said pusher means cooperating with said retaining means to form successive pockets for advancing rows of articles in uniformly separated relation, and means for imparting movement to said pusher means longitudinally of the conveyor and in timed relation with each other to cause them to engage and advance rollable articles in uniformly separated rows from groove to groove across the supporting members in the direction of travel of their upper surfaces.

5. In an apparatus for treating articles of a rollable nature such as fresh fruit and the like, a conveyor comprising a series of substantially cylindrical supporting members arranged in adjacent parallel relation transversely of the path of articles passing thereover and forming article holding grooves therebetween, means for rotating said supporting members in a common direction about fixed axes, the axial spacing of said supporting members being greater than the diameter of rollable articles being conveyed and the proportions of said supporting members relative to the size of conveyed articles being such that the supporting members are normally incapable of moving said articles from groove to groove thereacross, means extending longitudinally of the conveyor for retaining conveyed articles thereon, a plurality of resilient pusher means arranged above the conveyor and spaced apart the axial spacing of the supporting members, said resilient pusher means being sufficiently rigid to prevent them from dragging over articles beneath them and cooperating with said retaining means to form successive pockets for advancing rows of articles in uniformly separated relation, and means for imparting movement to said pusher means longitudinally of the conveyor and in timed relation with each other to cause them to engage and advance rollable articles in uniformly separated rows from groove to groove across the supporting members in the direction of travel of their upper surfaces.

6. In an apparatus for treating articles of a rollable nature such as fresh fruit and the like, a conveyor comprising a series of substantially cylindrical supporting members arranged in adjacent parallel relation transversely of the path of articles passing thereover and forming article holding grooves therebetween, means for rotating said supporting members in a common direction about fixed axes, the axial spacing of said supporting members being greater than the diameter of rollable articles being conveyed and the proportions of said supporting members relative to the size of conveyed articles being such that the supporting members are normally incapable of moving said articles from groove to groove thereacross, means extending longitudinally of the conveyor for retaining conveyed articles thereon, a carrier disposed above the conveyer in such a manner as to clear articles passing from groove to groove thereover, a plurality of pusher members depending from the carrier to contact with rollable articles resting in the grooves, said pusher members being spaced apart the axial spacing of the supporting members and cooperating with the retaining means to form successive article advancing pockets, and means for operating the carrier to move the pusher members in unison transversely of the supporting members in the direction of travel of their upper surfaces and slower than their peripheral speeds.

7. In an apparatus for treating articles of a rollable nature such as fresh fruit and the like, a conveyor comprising a series of substantially cylindrical supporting members arranged in adjacent parallel relation transversely of the path of articles passing thereover and forming article holding grooves therebetween, means for rotating said supporting members in a common direction about fixed axes, the axial spacing of said supporting members being greater than the diameter of rollable articles being conveyed and the proportions of said supporting members relative to the size of conveyed articles being such that the supporting members are normally incapable of moving said articles from groove to groove thereacross, a plurality of retaining walls above said supporting members and extending transversely thereto to form a plurality of adjacent runways, a plurality of pusher members disposed above the conveyor in each runway and spaced apart substantially the axial spacing of the supporting members; said pusher members cooperating with said retaining walls to form successive individual article advancing pockets, and means for imparting movement to said pusher members longitudinally of the conveyor and in timed relation to each other to cause them to engage and advance rollable articles in the pockets from groove to groove across the supporting members in the direction of travel of their upper surfaces.

8. In an apparatus for treating articles of a rollable nature such as fresh fruit and the like, a conveyor comprising a series of substantially cylindrical supporting members in adjacent parallel relation transversely of the path of articles passing thereover and forming article holding grooves therebetween, means for rotating said supporting members in a common direction about fixed axes, means extending longitudinally of the conveyor for retaining conveyed articles thereon, a plurality of fixedly mounted pendent pads arranged above the conveyor and cooperating with the retaining means and the cylindrical supporting members to form fruit retaining pockets for maintaining rows of fruit in uniformly separated relation, means for imparting movement to said pendent pads longitudinally of the conveyor and in timed relation with each other to control the advance of rollable articles from groove to groove across the supporting members in the direction of travel of their upper surfaces.

9. A method of treating rollable fruit and the like by a series of substantially cylindrical rolls arranged in adjacent parallel relation so as to form valleys therebetween supporting fruit, which comprises simultaneously rotating the rolls at a speed sufficient to rotate the fruit for treating purposes and insufficient to provide the necessary traction to advance the fruit from one valley to the adjacent valley, periodically propelling the fruit from each valley simultaneously across the treating rolls in the direction of travel of their upper surfaces to the adjacent valleys by separately applying a propelling force to the fruit in each valley, and periodically delivering fruit for treatment to the first of the valleys.

10. A method of treating rollable fruit and the like by a series of substantially cylindrical rolls arranged in adjacent parallel relation so as to form valleys therebetween to support the fruit, which comprises simultaneously rotating the rolls in a common direction and at equal speeds sufficient to rotate the fruit for treating purposes and insufficient to provide the necessary traction to advance the fruit from one valley to the adjacent valley, periodically propelling the fruit from each valley simultaneously across said treating rolls in the direction of travel of their upper surfaces to the adjacent valleys by separately applying a propelling force to the fruit in each valley, and periodically delivering fruit for treatment to the first of the valleys.

11. A method of treating rollable fruit and the like by a series of substantially cylindrical rolls arranged in adjacent parallel relation so as to form valleys therebetween to support the fruit, which comprises simultaneously rotating the rolls so as to subject fruit in the valleys to treatment for a period of time without advancement of the fruit from valley to valley, then simultaneously propelling the fruit from each valley across the treating rolls in the direction of travel of their upper surfaces to the adjacent valley by separately applying a propelling force to the fruit in each valley, and between the operations of propelling fruit from valley to valley supplying fruit to the first of the treating valleys.

12. A method of treating rollable fruit and the like by a series of substantially cylindrical rolls arranged in parallel relation so as to form valleys therebetween to support the fruit, which comprises simultaneously rotating the rolls at a speed sufficient to rotate the fruit for treating purposes and insufficient to provide the necessary traction to advance the fruit from one valley to the adjacent valley so as to subject the fruit to treatment in the valleys for a period without advancement of the fruit periodically separately applying propelling forces to the fruit in each valley in the direction of travel of the upper surfaces of the rolls so as to simultaneously propel fruit from each valley to the succeeding valley, and periodically as the first of the valleys is denuded of fruit delivering fruit to said valley.

13. A method of treating rollable fruit and the like by passing the same transversely across a series of treating rolls arranged in adjacent parallel relation to support the fruit for treatment in the valleys therebetween, which comprises the steps of delivering the fruit in successive rows to a valley between adjacent treating rolls, rotating said treating rolls in a common direction to subject the fruit to a limited amount of supporting traction sufficient to rotate the fruit for treating purposes but insufficient to advance the fruit from one valley to the next, propelling each successive row of fruit simultaneously from valley to valley across said treating rolls in the direction of travel of their upper surfaces and maintaining said rows of fruit in separate relation as they are propelled across the rolls.

14. A method of treating rollable fruit and the like by passing the same transversely across a series of treating rolls arranged in adjacent parallel relation to support the fruit for treatment in the valleys therebetween, which comprises the steps of delivering the fruit in successive rows to a valley between adjacent treating rolls, rotating said treating rolls in a common direction to subject the fruit to a limited amount of supporting traction sufficient to rotate the fruit for treating purposes but insufficient to advance the fruit from one valley to the next, propelling each successive row of fruit simultaneously from valley to valley across said treating rolls in the direction of travel of their upper surfaces and maintaining said fruit as it is propelled across the rolls in separated rows spaced apart substantially the center to center spacing of the rolls.

15. A method of treating rollable fruit and the like by passing the same transversely across a series of treating rolls arranged in adjacent parallel relation to support the fruit for treat- Search Roo ment in the valleys therebetween, which comprises the steps of delivering the fruit in successive rows to a valley between adjacent treating rolls, rotating said treating rolls in a common direction to subject the fruit to a limited amount of supporting traction sufficient to rotate the fruit for treating purposes but insufficient to advance the fruit from one valley to the next, propelling each successive row of fruit simultaneously from valley to valley across said treating rolls in the direction of travel of their upper surfaces, by the application of propelling forces acting in the direction of travel of the fruit, and maintaining said rows of fruit as they are propelled across the rolls in spaced apart relation substantially corresponding to the center to center spacing of the rolls.

LLOYD E. JONES.